United States Patent
Zeldin et al.

(10) Patent No.: US 11,631,125 B2
(45) Date of Patent: Apr. 18, 2023

(54) CALCULATING BIDS FOR CONTENT ITEMS BASED ON VALUE OF A PRODUCT ASSOCIATED WITH THE CONTENT ITEM

(71) Applicant: META PLATFORMS, INC., Menlo Park, CA (US)

(72) Inventors: Robert Oliver Burns Zeldin, Los Altos, CA (US); Chinmay Deepak Karande, Mountain View, CA (US); Shyamsundar Rajaram, San Francisco, CA (US); Leon R. Cho, Santa Clara, CA (US); Rami Mahdi, San Mateo, CA (US); Sushma Nagesh Bannur, Cupertino, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 275 days.

(21) Appl. No.: 15/640,052

(22) Filed: Jun. 30, 2017

(65) Prior Publication Data
US 2019/0005575 A1 Jan. 3, 2019

(51) Int. Cl.
*G06Q 30/08* (2012.01)
*G06Q 30/06* (2012.01)
*G06Q 30/0601* (2023.01)

(52) U.S. Cl.
CPC ......... *G06Q 30/08* (2013.01); *G06Q 30/0613* (2013.01)

(58) Field of Classification Search
CPC .......................... G06Q 30/08; G06Q 30/0613
USPC .......................... 705/26.3, 26.4, 26.41, 26.7
See application file for complete search history.

(56) References Cited

U.S. PATENT DOCUMENTS

| | | | |
|---|---|---|---|
| 9,355,155 B1 * | 5/2016 | Cassel | G06F 3/04842 |
| 2011/0035276 A1 * | 2/2011 | Ghosh | G06Q 30/02 705/14.46 |
| 2011/0246247 A1 * | 10/2011 | McCullough | G06Q 10/087 705/5 |
| 2011/0246267 A1 * | 10/2011 | Williams | G06Q 30/08 705/14.4 |
| 2013/0268508 A1 * | 10/2013 | Bracher | G06F 16/951 707/709 |
| 2015/0100423 A1 * | 4/2015 | Oldham | G06Q 30/0256 705/14.54 |
| 2017/0178199 A1 * | 6/2017 | Cessna | G06Q 30/0201 |

* cited by examiner

*Primary Examiner* — Luna Champagne
(74) *Attorney, Agent, or Firm* — Mannava & Kang, P.C.

(57) ABSTRACT

An online system calculates bids for content items to display to users based on the value of a product described in the content item and the likelihood of a viewing user purchasing the product. The online system identifies an impression opportunity for an ad request and computes an expected value of the conversion and a likelihood of the conversion. The online system computes a bid amount based on the expected conversion value and the likelihood of the conversion. Bids based on the value of the conversion allow a third party system offering the product to optimize for the value of each conversion instead of the conversion rate.

13 Claims, 3 Drawing Sheets

CALCULATING BIDS FOR CONTENT ITEMS BASED ON VALUE OF A PRODUCT ASSOCIATED WITH THE CONTENT ITEM

BACKGROUND

This invention relates generally to presenting content to users of an online system and more specifically to determining bids content items in an auction.

Online systems, such as social networking systems, allow users to connect to and communicate with other users of the online system. Users may create profiles on an online system that are tied to their identities and include information about the users, such as interests and demographic information. The users may be individuals or entities, such as corporations or charities. Online systems allow users to easily communicate and share content with other online system users by providing content to the online system for presentation to other users. Content provided by a user to an online system may be declarative information, such as status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Various publishing users or third party systems may provide the online system with content items identifying products associated with the publishing users or third party systems, such as products a publishing user or a third party system offers for sale. However, different users may have varying levels of interest in different products associated with a publishing user or a third party system. For example, if various products are offered for sale by a publishing user, if the publishing user selects content about a particular product for inclusion in a content item, users who are uninterested in the particular product may be less inclined to view or to interact with the content item. Thus, online systems generate revenue by targeting content to users of the online system. Content targeting provides users with more relevant content and is more cost-effective than traditional forms of content delivery because a targeted content item is only shown to a viewing user likely to be interested in the content item. Online systems use an auction process to select a content item for each impression (i.e. an instance that a content item can be shown to the viewing user). The auction process selects a content item based on a bid associated with the content item. The value of the bids associated with the content item are based on the conversion rate, or the number of times the content item leads to a successful objective, such as the viewing user clicking on a link or purchasing a product associated with the content item. However, bids based on conversion rates do not take into account the value of a product or service being described in the content item. Thus, content items with high conversion values that also have low conversion rates are often overlooked by conventional online systems or are not as competitive in the auction process since bids associated with content items are optimized for the number of conversions.

SUMMARY

An online system optimizes bids for content items based on return on content item spend, or how much the user is likely to spend in a conversion of the content item. The system receives an content item request from a third party system to present an content item to users of an online system. The system also receives bidding input from the third party system that can be used, for example, to determine the minimum ROI or ratio representing the amount per unit value. When an impression opportunity to provide the content item to a viewing user of the online system arises, the online system determines how much the user is likely to spend in a conversion of the content item for that impression opportunity. In one embodiment, the online system computes a bid amount based on the how much the user is likely to spend in a conversion of the content item scaled by the minimum ROI. In one embodiment, the bid amount is computed as based on a product of the minimum ROI, the likelihood of a conversion for the content item, and how much the user is likely to spend in a conversion of the content item. The computed bid amount for the content item can then be used in a content item selection process or auction in which content items are selected for presentation to the viewing user.

How much the user is likely to spend in a conversion of the content item may be based on any number of user and content item-specific features. For example, the online system may generate and apply a machine learned module that considers both historical organic spending for a user and attributed spending. In one embodiment, the online system provides as inputs to the model features associated with organic spending (e.g., a user's top websites by total spend over number of days, a user's number of purchase events, etc.) and labels associated with attributed spending (e.g., impression occurrences, a monetary amount spent after each impression occurrence, etc.). The output of the model, in one embodiment, is an estimate of amount the viewing user is likely to spend per conversion. The estimated amount the viewing user is likely to spend per conversion can then be added as a term to the bid determination equation to set the bid for the viewing user for a given content item such that the bid includes return on spend as part of the calculation. Accordingly, the online system allows third party systems to optimize for the monetary value of conversions of a content item, rather than merely the number of conversions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
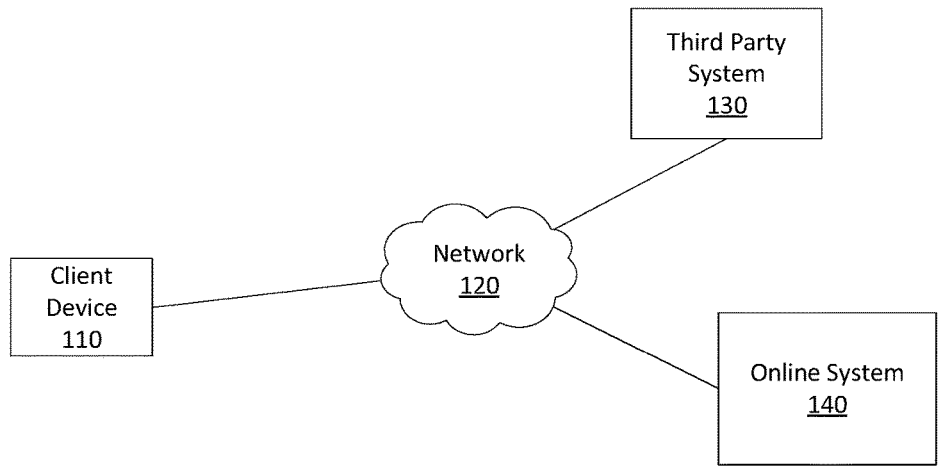
FIG. 1 is a block diagram of a system environment for an online system, in accordance with an embodiment of the invention.

FIG. 1 is a high level block diagram of a system environment 100 for an online system 140. The system environment 100 shown by FIG. 1 comprises one or more client devices 110 and a network 120, a third party system 130, and the online system 140. In alternative configurations, different and/or additional components may be included in the system environment 100. The embodiments described herein can be adapted to a generic online system or to an advertising system that is part of a social networking system.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a tablet, or another suitable device. A client device 110 is configured to communicate via the network 120. In one embodiment, a client device 110 executes an application allowing a user of the client device 110 to interact with other client devices 110 and servers, such as the online system 140 or a social networking system. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, LTE (Long Term Evolution), code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 are coupled to the network 120. The third party system 130, which may be embodied as a device of a third party system, such as an advertising entity (e.g., a server hosted by an online advertising entity, a mobile device used by an advertiser, etc.), communicates with the online system 140, which is further described below in conjunction with FIG. 2. In one embodiment, the third party system 130 is an application provider communicating information describing applications for execution by a client device 110 or communicating data to client devices 110 for use by an application executing on the client device. A third party system 130 may communicate information to the online system 140, such as advertisements, content items, or information for publication to one or more client devices 110.

Figure 2:
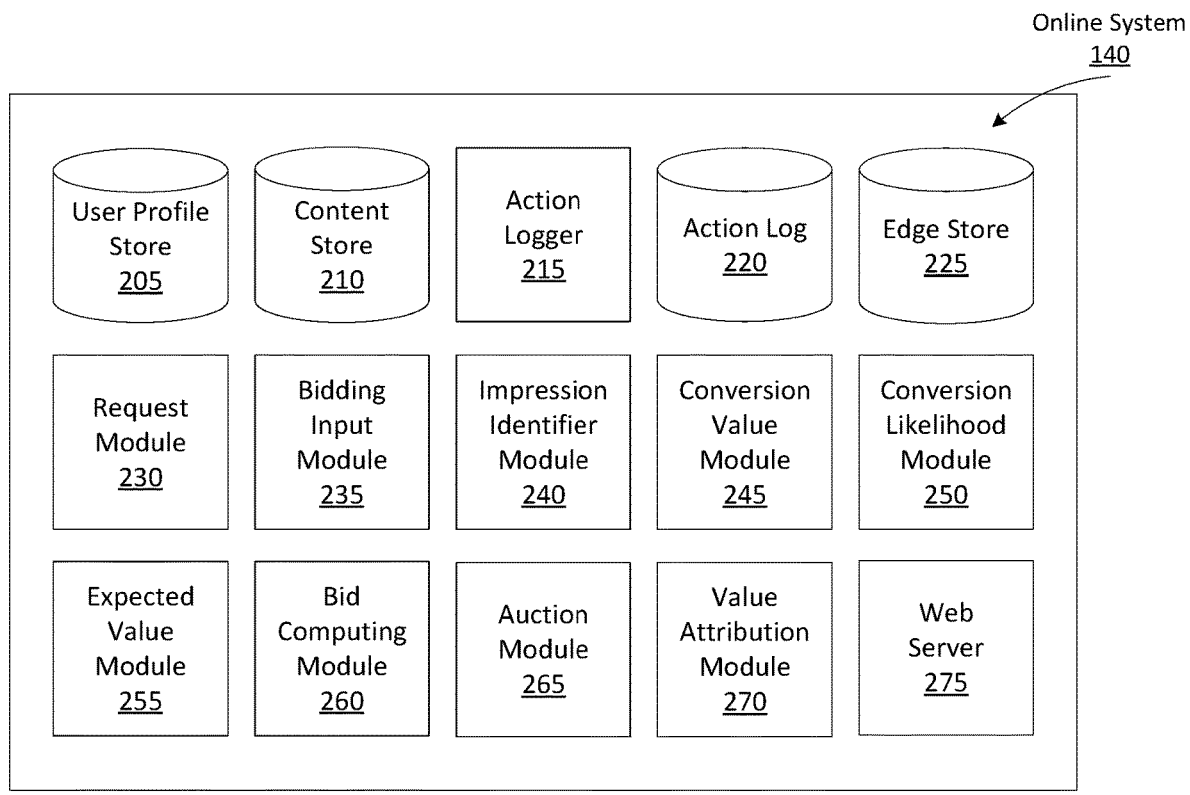
FIG. 2 is a block diagram of online system, in accordance with an embodiment of the invention.

FIG. 2 is an example block diagram of an architecture of the online system 140. The online system 140 shown in FIG. 2 includes a user profile store 205, a content store 210, an action logger 215, an action log 220, and edge store 225, an ad request module 230, a bidding input module 235, an impression identifier module 240, a conversion value module 245, a conversion likelihood module 250, an expected spend module 255, a bid computing module 260, an auction module 265, a value attribution module 270, and a web server 275. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative and bidding input information. The creative includes content for presentation to a user, such as text, image, audio, video, or any other suitable data presented to a user. In various embodiments, the creative also specifies a page of content. For example, a content item includes a landing page specifying a network address of a page of content to which a user is directed when the content item is accessed. The bidding input information is included in a content item by a user and is used to determine monetary compensation provided by an advertiser or third party system 130 to the online system 140 responsive to content in the content item being presented to a viewing user, responsive to the content in the content item receiving a user interaction when presented, or responsive any suitable condition being satisfied when content in the content item is presented to a viewing user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with content items and advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Additionally, actions a user performs via an application associated with a third party system 130 and executing on a client device 110 may be communicated to the action logger 215 by the application for recordation and association with the user in the action log 220.

In one embodiment, the action log 220 uses a tracking pixel or piece of HTML code placed on third-party websites to monitor users visiting the websites that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser loads a page having the tracking pixel, the tracking pixel results in the user's browser attempting to retrieve the content for that pixel, and the browser contacts the online system 140 to retrieve the content. The request sent to the online system 140, however, actually includes data corresponding to the user's actions taken on the third party website. The third party website can control what data is sent to the online system 140. For example, information may be included about a page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system 140 can also be retrieved by the online system 140, which can include data for the user, such as the online systems' UID for the user, information about the client device and the browser, such as the Internet Protocol (IP) address of the client device, among other data. Tracking can also be performed on mobile applications of content providers by using a software development kit (SDK) of the online system 140 or via an application programming interface (API) of the online system 140 to track events (e.g., purchases) that occur by users on the content provider's app that are reported to the online system 140.

The online system 100 can then use this data received about the user to serve better content to the user in the future (e.g., since the online system has further data about products purchased or browsed that might be of interest), and can also use this in retargeting of that product to the user (e.g., where the user went to the product page on a third party site by clicking on content from the third party system 130 presented to the user in the online system 140). The online system 140 can also use this data in conversion tracking and reporting results of advertising campaigns to the third party system 130. For example, if the third party system 130 has paid the online system 140 to serve content (e.g., content item for products being offered for sale by the third party system 130), and a particular user views content on the online system 140 and then purchases a product described in the content (possibly at some point later, and possibly on a different device), the online system 140 can link the purchase/conversion to the content originally shown on the online system 140, as described further below with respect to value attribution module 270. Thus, the online system 140 can include this data in its reporting to the third party system 130 with respect to a number of conversions associated with the content item.

The edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The request module 230 receives a request from a third party system 130. The request includes a content item for presentation to a viewing user. The content item can include text, image, audio, video, or any other suitable data describing a product or service and that can be presented to the viewing user. In various embodiments, the content item also includes a landing page specifying a network address to which the viewing user is directed when the content item is accessed.

Additionally, the request may include one or more targeting criteria specified by the third party system 130. Targeting criteria included in a request may specify one or more characteristics of viewing users eligible to be presented with content in the request. As discussed above, targeting criteria can be a filter to apply to fields of a user profile and/or actions associated with a viewing user to identify users having user profile information or actions satisfying at least one of the targeting criteria. The user profile and/or actions may be tracked by the online system 140 or by a social networking system connected through the network 120 to the online system 140. Hence, the targeting criteria allow a third party system to identify groups of users matching specific targeting criteria, simplifying subsequent distribution of content to groups of users.

In various embodiments, the online system 140 is a social networking system and the targeting criteria may specify actions or types of connections between a user and another user or object of the social networking system. The targeting criteria may also specify interactions between a user and objects performed external to the social networking system, such as objects on a server associated with an third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from an third party system 130, or any other suitable action. Including actions in the targeting criteria allows advertisers to further refine users eligible to be presented with content from a request. As another example, targeting criteria may identify users having a connection to another user or object or having a particular type of connection to another user or object.

The bidding input module 210 determines a minimum ROI for the request. The minimum ROI is a target amount that the third party 130 is willing to pay per unit value of a conversion of the content item associated with the request. The minimum ROI can be a ratio, a percentage, a dollar value, or any other indication of an amount relative to the value of the conversion of the content item. For example, the minimum ROI can be a ratio that specifies what the third party system 130 is willing to pay 100 per dollar value of a conversion or that the advertiser 130 will pay 10% of the value of the conversion. In other examples, the minimum ROI is an amount that specifies what the third party system 130 is willing to pay per the total value of the conversion or user spend associated with a conversion of the content item. For example, the minimum ROI can specify that the third party system 130 will pay $1 for a conversion worth $10.

The bidding input module 235 determines the minimum ROI based on a bidding input received from the third party system 130. The bidding input indicates an amount that the third party system 130 is willing to spend on the bid. In some embodiments, the bidding input is the a budget for a campaign (i.e., the third party system 130 is willing to spend $10 per conversion). The bidding input module 235 determines the minimum ROI by scaling the budget by the value of a conversion. In some embodiments, the bidding input is a minimum ROI provided by the third party system 130 or a minimum ROI from a previous request associated with the same content. The bidding input can depend on the impression opportunity. For example, the bidding input for an impression opportunity that meets all of the request's targeting criteria may be valued more than an impression opportunity that meets a lower number of targeting criteria. In some embodiments, the bidding input module 235 determines the minimum ROI using a formula, algorithm, or equation provided by the third party system 130. For example, the third party system 130 might provide a bid using a standard bidding model in which the bid is optimized for the number of conversions and not the value of the conversions, and the bidding input module 235 can determine the minimum ROI based on this bidding input. In this example, the bidding input module 235 might determine the minimum ROI using information such as past history of bidding for the third party system 130, past indications by the third party system 130 of the value of various types of conversions, based on general information provided by the third party system 130 about conversion values for different impression opportunities or information obtained by observing conversions for the third party system 130 over time from many different users of the online system 140, among other data and any combination of these data.

The impression identifier module 240 identifies an impression opportunity to deliver the content item to a viewing user of the online system 140. For example, the module 240 can identify an impression opportunity for the content item associated with the request. The impression opportunity is an instance during which the online system 140 can display a content item to a viewing user. For example, the impression opportunity can occur when a user accesses a web page with space to display the content item. The impression identifier module 240 selects content items for the impression opportunity based on the targeting criteria and/or content associated with various requests, including the request received by the third party system 130. In some embodiments, the impression identifier module 240 selects a content item for the impression opportunity if the viewing user matches a threshold number of targeting criteria.

The conversion value module 245 estimates a value of the conversion ("estimated conversion value"). The estimated conversion value is a prediction of the monetary worth of a single conversion for the content item. In one embodiment, this is the estimated conversion value for a conversion is the estimated amount a particular viewing user will spend converting on the content item or for a conversion involving a particular impression opportunity (since there can be more than one impression opportunity with a given viewing user). The value of a conversion of a content item can differ for different viewing users or across different impression opportunities. For example, a conversion of a content item for a social game application involving a viewing user that frequent plays social games might be more valuable than a conversion of the content item involving a viewing user that rarely uses social games, even though the third party system 130 may realize the same amount of money from each user's purchase of the game as a result of the content item. Since the game user plays games frequently, this user is much more likely to share this game with others, possibly resulting in multiple additional purchases of the game and more overall value to the third party system 130. Further, some social games include in app purchases and the estimated amount the user will spend on a conversion for the game user who frequently plays social games will likely be a higher value relative to the user who rarely plays games. Similarly, out of two impression opportunities for the game user, conversions associated with certain impression opportunities may be more valuable than others. For example, a conversion that occurs for an impression opportunity on a social networking website versus a news website might be more likely to result in the game user more immediately playing the social game and immediately sharing with others that might buy the game.

The estimated conversion value typically is the value of the product or service described in the content item, but it can also be the revenue generated per conversion, the profit per conversion, the monetary impact of the conversion on the advertiser's competitor, or any other value associated with the conversion for the content item. The third party system 130 can provide the estimated conversion value or the estimated amount the viewing user will spend on a conversion to the conversion value module 245. In some embodiments, the third party system 130 includes the estimated conversion value for the content item or the price of a product described in the content item in the request. For example, an third party system 130 may specify in the request that the conversion value is $65 for a $65 video game. The estimated conversion value can be based on other content item-specific information. In other embodiments, the online system 140 determines the estimated conversion value automatically or without input from the advertiser.

In some embodiments, the conversion value module 245 calculates the estimated conversion value based on information about the viewing user, since as explained above, the estimated conversion value may be different for different viewing users. The conversion value module 245 can use a statistical formula, a machine learning model, or any other formula to calculate the estimated conversion value, and the formula or algorithm used can be provided by the advertiser or set by the conversion value module 245. Where the formula or algorithm is set by the conversion value module 245, the module 245 may receive the inputs to the formula from the third party system 130 or may determine the inputs itself.

The formulas used by the conversion value module 245 can be a function of user-specific information known by the online system 140. For example, in embodiments in which the online system 140 interfaces with a social networking system, the conversion value module 245 receives profile information that describes viewing user characteristics, social connections, and online interactions associated with the viewing user. The conversion value module 220 calculates the estimated conversion value based on the received profile information. In some embodiments, the estimated conversion value can be based on the time of day the content item is displayed, the content item, the viewing user's geographic location, or certain characteristics of or information about the viewing user. The conversion value module 245 can use information about the product or service known by the third party system 130 to calculate the estimated conversion value. For example, the conversion value module 245 can use the price of the good or service or other financial information not provided in the request to calculate the determined conversion value. Other examples of the conversion value module 245 use a machine learning algorithm, based on information specific to the viewing user, to determine the estimated conversion value.

Figure 3:
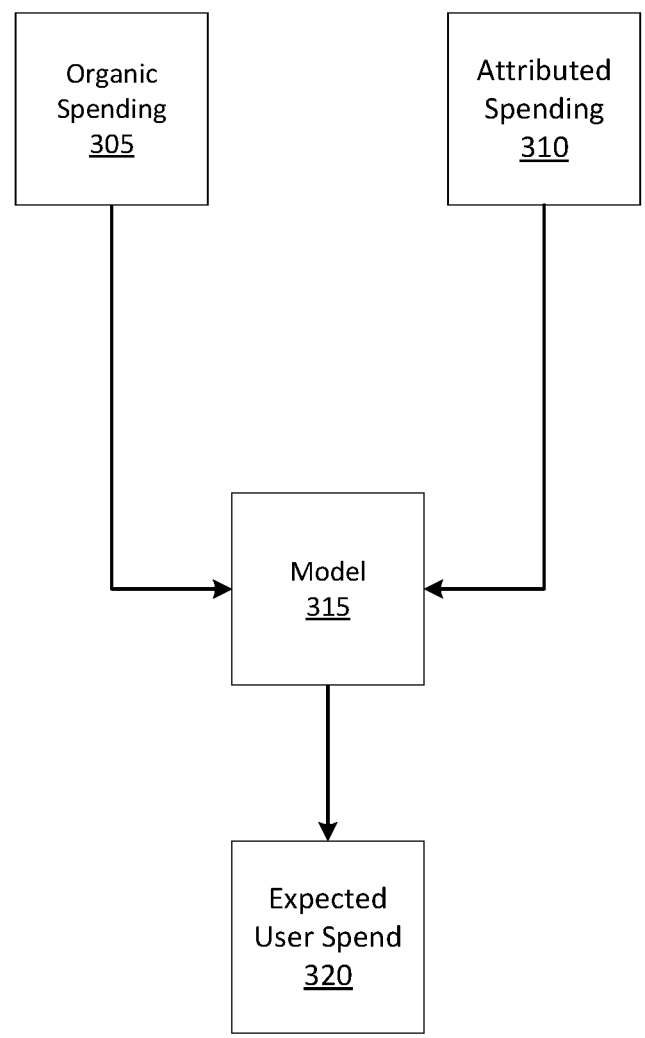
FIG. 3 is a flow diagram of model training process within the system of FIG. 2, in accordance with an embodiment of the invention.

In one embodiment, the conversion value module 245 applies machine learning techniques to generate a model that when applied to a set of content items, can select the optimal content item or set of content items that will provide the content provider with the highest return on the content provider's investment, spend, or conversion value for presenting that content item to a particular user or group of users. FIG. 3 shows a flow diagram of model training process in accordance with various embodiments. The conversion value module 245 generates a model 315 that selects the optimal content item that will provide the third party system 130 with the highest return on investment, expect amount of user spend, or conversion value for presenting that content item to a particular user. The model 315 uses obtaining organic spending 305 for users of the online system 140 as inputs for predicting or estimating whether a user will purchase a product or how much a user will spend as a result of performing a conversion (e.g., from in-app purchases upon installing an application). As described above, the organic spending 305 information can be obtained via tracking pixels or reported from the third party system 130. The conversion value module 245 additionally uses attributed spending 310, as further described with respect to value attribution module 270.

Accordingly, conversion value module 245 extracts feature values from the content items associated with the organic spending 305 and attributed spending 310 including characteristics of users making the individual purchases to determine the expect amount a particular viewing user will spend upon being presented with a given content item. An ordered list of the features for a content item is herein referred to as the feature vector for the content item. In one embodiment, the content delivery module applies dimensionality reduction (e.g., via linear discriminant analysis (LDA), principle component analysis (PCA), or the like) to reduce the amount of data in the feature vectors for content items to a smaller, more representative set of data. The model 315, when given a particular viewing user, will therefore output the expected user spend 320 by comparing the spending habits and characteristics of the particular viewing user to the characteristics and spending habits of other users of the online system 140. In one embodiment, the conversion value module 245 uses supervised machine learning to train the model with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments that make use of a machine learned model. The model, when applied to the feature vector extracted from a content item, outputs an indication of whether the content item has the property in question, such as a Boolean yes/no estimate, or a scalar value representing a probability.

The conversion likelihood module 250 calculates a likelihood or probability of the conversion, herein referred to as the "conversion likelihood," of the content item by the viewing user. The conversion likelihood module 225 calculates the conversion likelihood based on user-specific information known by the online system 140. In one embodiment, the conversion likelihood module 225 receives profile information associated with the viewing user. The profile information can be from the viewing user's profile on a social networking system and may include characteristics of the viewing user, social networking connections of the viewing user, and interactions the viewing user has performed in the social networking system. The conversion likelihood module 250 calculates the conversion likelihood based on user-specific information known about the viewing user, such as the viewing user's profile information. For example, viewing user's with certain characteristics (e.g., users of certain age ranges, certain demographics, in certain locations, having certain likes and dislikes, among other characteristics) might be known to be more likely to click on an ad and buy a product based on the click than other users. Another factor that might be considered in by the conversion likelihood module 250 is historical information about a given user's clicks on content items, since users who click frequently on content items might be more likely to click again. Similarly, a user might be more likely to click on content items of a certain type (e.g., content items with images versus those without, content items on a particular topic, content items that include social context about friends or social networking connections who may have liked the product, content items shown at particular times of day or days of the week, etc.). The conversion likelihood is calculated separately for each viewing user or impression opportunity and can be specific to each viewing user or impression opportunity.

The expected value module 255 calculates the expected value of the conversion of the content item ("expected conversion value"). The expected conversion value is the estimated conversion value (or estimated amount a particular viewing user will spend) adjusted for the likelihood of the conversion. The expected conversion value is based on both the estimated conversion value and the conversion likelihood. In some embodiments, the expected conversion value is the product of the conversion likelihood and the estimated conversion value. However, the expected value module 255 can use other equations, formulas, or algorithms based on the estimated value of the conversion to calculate the expected value of the conversion.

The bid computing module 260 computes a bid amount for the impression opportunity. The bid amount is based on both the expected conversion value and on the minimum ROI. In some embodiments, the bid amount is computed by scaling the expected conversion value by the minimum ROI, such as by multiplying the expected conversion value by the minimum ROI.

The auction module 265 receives the bid amount and associates the bid amount with the request. The request is submitted to an auction process. The online system 140 uses the auction process to select a content item to display to the viewing user. The content item selection is based on the bid amount and may additionally be based on the tracking criteria associated with the content item. In embodiments in which the third party system is connected to a social network, the content item may be displayed on a social network interface, such as a newsfeed.

The value attribution module 270 attributes a portion of the expected value of the conversion to the content item selected by the auction module 265. The value attribution module 270 tracks subsequent actions by the viewing user after the online system 140 provides the content item for display to the viewing user or after the user clicks on the content item. The value attribution module 270 receives an indication of a conversion by the viewing user (e.g., determines that the user purchased the product described in the content item). Based on the tracked actions, the value attribution module 270 attributes a portion of the expected conversion value to the content item. The portion of the expected conversion value can be a binary number (1=conversion attributed to the content item|0=conversion not attributed to the content item), a percentage (e.g., 30% of the expected conversion value is attributed to the content item), or a dollar value (e.g., $20 is attributed to the content item). Conversion attribution information may be sent to the conversion value module 245 to improve the formula or algorithm that calculates the estimated conversion value and thus the expected conversion value. For example, this information can be used in a machine learning process to improve the ability of the conversion value module 245 to determine the estimated conversion value for each viewing user or impression opportunity.

The web server 275 links the online system 140 via the network 120 to the one or more client devices 110, as well as to the one or more advertisers 130. The web server 275 serves web pages, as well as other web-related content, such as JAVA®, FLASH®, XML and so forth. The web server 275 may receive and route messages among the third party systems 130, the online system 140, and the client device 110, for example, ad content, messages, or other information. Additionally, the web server 275 may provide application programming interface (API) functionality to send data directly to native client device operating systems, such as IOS®, ANDROID™, WEBOS® or RIM®.

Method for Calculating Bids for Content Items Based on Expected User Spend

Figure 4:
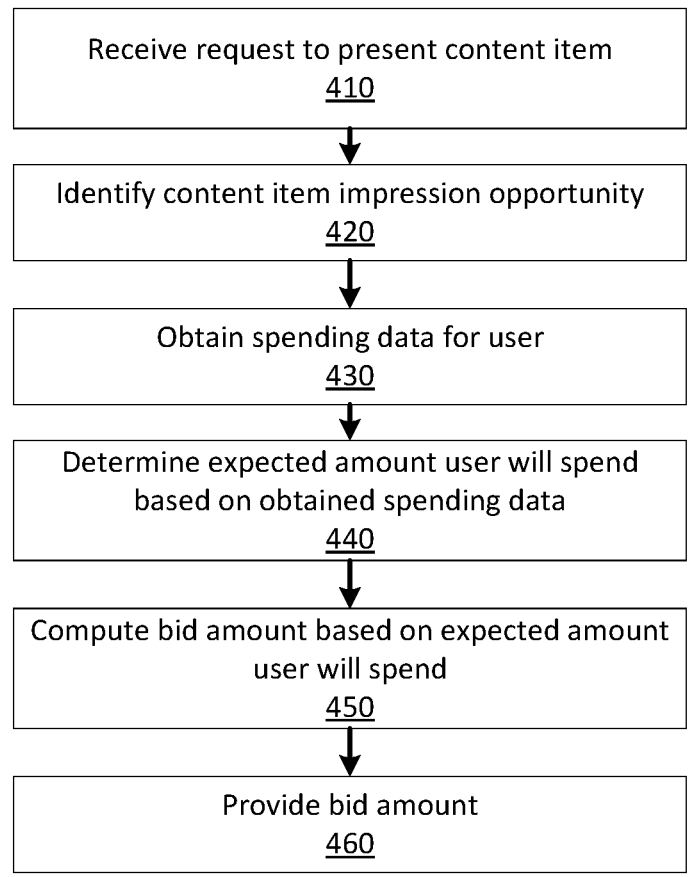
FIG. 4 is a flowchart of a process for calculating a bid for an content item based on the content item's conversion value, in accordance with an embodiment of the invention.

FIG. 4 is a flowchart of a process for calculating a bid for a content item based on the estimated amount a user will spend on a product associated with the content item, in accordance with an embodiment of the invention. Unless otherwise noted, the process of FIG. 4 is performed by the online system 140, which may store instructions that cause a processor on the online system 140 to execute the process described in FIG. 4. The process of FIG. 4 may include additional or alternative steps.

The online system 140 receives 410 an request from the third party system 130. The request includes content describing a product offered for sale by the third party system. The content includes but is not limited to text, image, audio, video, or any other data suitable for presentation to a viewing user. The request can also include targeting criteria, which specifies one or more characteristics of viewing users eligible to be presented with content in the request. The targeting criteria specify actions, profile information, or connections of a viewing user associated with eligible viewing users.

The online system 140 may receive a bidding input from the third party system 130. The bidding input indicates how much the third party system 130 is willing to pay to display the content item. The bidding input can be a maximum or minimum value for a bid for the request, a budget for the content item, or a minimum ROI for the content item. The bidding input can be received from the third party system 130 (e.g., as part of the content item request). In some embodiments, in which the online system is connected to a social networking system, the online system 140 determines the bidding input based on tracked interactions of the viewing user in the social networking system and profile information of the viewing user.

The online system 140 may then additionally determine a minimum ROI based on the bidding input. The minimum ROI is an amount that the third party system is willing to pay per unit of value of a conversion of the content item. The minimum ROI can be expressed as a ratio, a percentage, a dollar amount, or any other suitable expression of value. For example, the minimum ROI can indicate the third party system 130 is willing to pay 25 ¢ per dollar value of the conversion for the content item. The minimum ROI can be submitted as part of the content item request by the third party system 130 or can be determined by the online system 140 using a formula, algorithm, or other equation provided by the third party system 130. The equation may be a function of the targeting criteria for the content item and user-specific information about the viewing user.

The online system 140 identifies 420 an impression opportunity to present the content item to a viewing user. For example, a viewing user may have just refreshed a page or navigated to a new page, and hence there is an opportunity to provide content to the viewing user. The online system 140 might also identify 420 that the impression opportunity is one that is appropriate for the content item of the third party system that was received 410, since it may match the targeting criteria of that content item request. The impression opportunity is an instance during which the online system 140 can provide an content item for display to a viewing user. The online system 140 can identify 420 that the impression opportunity is one that matches the content item request by using an affinity score representing the affinity of the viewing user for the content item or content item request. The affinity score is a measure of the viewing user's affinity for the content item associated with the content item request and may be based on profile information belonging to the viewing user, such as profile information from a social network. Further description of affinity scores is provided in U.S. Pat. No. 8,402,094, which is hereby referenced in its entirety. Furthermore, the online system 140 can identify 420 that the impression opportunity is a match for the content item request based on other factors related to the impression opportunity, such as the time of day of the impression, the web page the impression is displayed on, and the placement of the content item.

The online system 140 obtain 430 spending data from third party systems for users of the online system. The spending data includes organic spending and attributed spending with characteristic of the users who engaged in the spending. The spending data and associated characteristics of the users are used to train a machine learning model that predicts a likelihood of a user taking a desired action with respect to the content item. In one embodiment, the desired action is the expected (or estimated) amount that a particular given user will spend on a product in response to being shown a content item describing the product.

Accordingly, the online system 140 determines 440 an expected amount that a user will spend on a product in response to being shown the content item. The expected amount can be the value of the conversion associated with the value of a product or service described by the content item, the revenue generated by the conversion, the profit generated by the conversion, the impact of the conversion on a competitor of the third party system 130, or any other value. The expected amount that a user will spend in a conversion can be provided by the third party system 130 or determined by the online system 140 using a statistical formula, a machine learning algorithm, or any other relevant function or equation. The online system 140 can use user-specific information known by the online system 140 to calculate the expected amount that a user will spend in a conversion. For example, if the online system 140 is connected to a social networking system, the online system 140 can use profile information, social connections, or tracked interactions to calculate the expected amount that a user will spend. Furthermore, the online system 140 can use information about the product or service to determine 450 the expected value of the conversion. For example, the online system 140 can determine the expected value of the conversion based on the price of the good or service. The online system 140 can also take into account the likelihood of the conversion when determining 440 the expected amount that a user will spend.

The online system 140 computes 450 a bid amount. The bid amount is the amount bid by the third party system 130 to display the content item during the impression opportunity and is based on the expected amount that a user will spend. In one embodiment, the bid amount is based on both the expected amount that a user will spend in the conversion as well as the minimum ROI. In some embodiments, the bid amount is the product of the expected amount that a user will spend and the minimum ROI. Accordingly, this provides the online system 140 with a mechanism to increase the bid amount for higher price products with low conversion rates relative to lower priced products with comparatively higher conversion rates.

The online system 140 provides 460 the bid amount to an content item selection process. The content item selection process can be an advertising auction performed by the online system 140 or performed by another system. The bid amount is provided with the content item request to the advertising auction. Based on the bid amounts of the provided content item requests, the online system 140 selects an content item to provide for display to the viewing user.

The online system 140 may track actions by the viewing user after providing the viewing user with the selected content item. While tracking the actions of the viewing user, the third party system can receive an indication that the content item conversion occurred. The indication of the conversion can be any tracked action by the viewing user, such as following a link, making a purchase, viewing an content item, visiting a landing page, or any other relevant action. Based on the tracked actions by the viewing user, the online system 140 attributes a portion of the expected conversion value to the content item. The online system 140 can use any statistical formula, machine learning algorithm, or other apparent function to calculate the attributed portion of the expected value of the conversion.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an online system, a request from a third party system to present a content item to a plurality of users of the online system, the content item describing a product offered for purchase by the third party system;
   generating, by the online system, a machine learning model that estimates an expected amount a user will spend on one or more purchases associated with the product described in the content item, wherein generating the model includes:
   obtaining, from a plurality of third party systems, attributed spending data and organic spending data for a plurality of purchases by users of the online system, the organic spending data corresponding to individual purchases made by the users of the online system that are obtained via a tracking pixel on a third party website associated with each third party system, the attributed spending data and the organic spending data for each purchase including one or more products associated with the purchase, a price of each product, and characteristics of a purchasing user; and
   training the machine learning model, using feature vectors of positive and negative training data sets, to estimate the expected amount the user will spend on one or more purchases for a given product based on the organic spending data and attributed spending data of the users of the online system sharing characteristics in common with the user, wherein the machine learning model employs a machine learning technique comprising at least one of linear support vector machine (SVM), boosting, neural networks, logistic regression, naïve Bayes, memory-based learning, random forests, bagged trees, decision trees, boosted trees, or boosted stumps;
   identifying an impression opportunity to deliver the content item to a viewing user of the plurality of users of the online system;
   determining, using the machine learning model by the online system, an expected amount the viewing user will spend on one or more purchases associated with the product described in the content item for the impression opportunity, wherein:
   the expected amount the viewing user will spend is based on a likelihood of a conversion of the content item by the viewing user and the estimated amount the viewing user will spend on the conversion, and the expected amount represents a value of the conversion associated with the value of a product or service described by the content item;
   computing a bid amount for the content item as a function of the expected amount the viewing user will spend on one or more purchases associated with the product described in the content item for the impression opportunity and a minimum return on investment (ROI), wherein:
   the computed bid amount optimizes for a value of the viewing user converting on the content item for the impression opportunity, and is computed based in part by:
   scaling the expected amount the viewing user will spend,
   the minimum ROI,
   likelihood of conversion for the content item, and
   how much the viewing user is likely to spend in the conversion of the content item; and
   the minimum return on investment (ROI) is expressed as a relative value of converting on the content item and based on a bidding input from the third party system, wherein the bidding input comprises information associated with a combination of past history of bidding for the third party system, past indications by the third party system of a value of various types of conversions, general information provided by the third party system about conversion values for different impression opportunities, and information obtained by observing conversions for the third party system over time from various users of the online system; and
   providing the computed bid amount for the content item to a content item selection process.

2. The method of claim 1, further comprising:
   selecting, in the content item selection process, the content item for presentation to the viewing user based on the computed bid amount; and
   providing the selected content item for display to the viewing user;
   tracking one or more interactions between the viewing user and the content item;
   receiving an indication that a conversion associated with the content item occurred; and
   attributing a portion of the expected amount the viewing user will spend to the conversion of the content item as attributed spending.

3. The method of claim 1, wherein the expected amount the viewing user will spend converting on the content item is a function of each individual impression opportunity for the content item.

4. The method of claim 3, wherein the expected amount the viewing user will spend converting on the content item is different for the viewing user relative to at least one other user of the online system.

5. The method of claim 1, further comprising:
obtaining user profile information for the viewing user; and
determining, based on the received user profile information, the likelihood of the conversion of the content item by the viewing user.

6. A computer program product comprising a non-transitory computer-readable storage medium containing computer program code for:
receiving, by an online system, a request from a third party system to present a content item to a plurality of users of the online system, the content item describing a product offered for purchase by the third party system;
generating, by the online system, a machine learning model that estimates an expected amount a user will spend on one or more purchases associated with the product described in the content item, wherein generating the model includes:
obtaining, from a plurality of third party systems, attributed spending data and organic spending data for a plurality of purchases by users of the online system, the organic spending data corresponding to individual purchases made by the users of the online system that are obtained via a tracking pixel on a third party website associated with each third party system, the attributed spending data and the organic spending data for each purchase including one or more products associated with the purchase, a price of each product, and characteristics of a purchasing user; and
training the machine learning model, using feature vectors of positive and negative training data sets, to estimate the expected amount the user will spend on one or more purchases for a given product based on the organic spending data and attributed spending data of the users of the online system sharing characteristics in common with the user, wherein the machine learning model employs a machine learning technique comprising at least one of linear support vector machine (SVM), boosting, neural networks, logistic regression, naïve Bayes, memory-based learning, random forests, bagged trees, decision trees, boosted trees, or boosted stumps;
identifying an impression opportunity to deliver the content item to a viewing user of the plurality of users of the online system;
applying the trained machine learning model for determining an expected amount the viewing user will spend on one or more purchases associated with the product described in the content item for the impression opportunity, wherein:
the expected amount the viewing user will spend is based on a likelihood of a conversion of the content item by the viewing user and the estimated amount the viewing user will spend on the conversion by the viewing user, and the expected amount represents a value of the conversion associated with the value of a product or service described by the content item;
computing a bid amount for the content item as a function of the expected amount the viewing user will spend on one or more purchases associated with the product described in the content item for the impression opportunity and a minimum return on investment (ROI), wherein:
the computed bid amount optimizes for a value of the viewing user converting on the content item for the impression opportunity, and is computed based in part by:
scaling the expected amount the viewing user will spend,
the minimum ROI,
likelihood of conversion for the content item, and
how much the viewing user is likely to spend in the conversion of the content item; and
the minimum return on investment (ROI) is expressed as a relative value of converting on the content item and based on a bidding input from the third party system, wherein the bidding input comprises information associated with a combination of past history of bidding for the third party system, past indications by the third party system of a value of various types of conversions, general information provided by the third party system about conversion values for different impression opportunities, and information obtained by observing conversions for the third party system over time from various users of the online system; and
providing the computed bid amount for the content item to a content item selection process.

7. The computer program product of claim 6, wherein a higher expected amount that the viewing user will spend on one or more purchases associated with the product increases the computed bid amount relative to a lower expected amount that the viewing will spend.

8. The computer program product of claim 6, wherein the spending data corresponds to individual purchases made by the plurality of users of the online system, for each purchase the spending data includes a product associated with the purchase, a price of the product, and characteristics of a purchasing user.

9. The computer program product of claim 6, wherein the expected amount the viewing user will spend converting on the content item is a function of each individual impression opportunity for the content item.

10. A method comprising:
receiving, by an online system, a request from a third party system to present a content item to a plurality of users of the online system, the content item describing a product offered for purchase by the third party system;
generating, by the online system, a machine learning model that estimates an expected amount a user will spend on one or more purchases associated with the product described in the content item, wherein generating the model includes:
obtaining, from a plurality of third party systems, attributed spending data and organic spending data for a plurality of purchases by users of the online system, the organic spending data corresponding to individual purchases made by the users of the online system that are obtained via a tracking pixel on a third party website associated with each third party system, the attributed spending data and the organic spending data for each purchase including one or more products associated with the purchase, a price of each product, and characteristics of a purchasing user; and
training the machine learning model, using feature vectors of positive and negative training data sets, to estimate the expected amount the user will spend on one or more purchases for a given product based on the organic spending data and attributed spending data of the users of the online system sharing characteristics in common with the user, wherein the machine learning model employs a machine learning technique comprising at least one of linear support vector machine (SVM), boosting, neural networks, logistic regression, naïve Bayes, memory-based learning, random forests, bagged trees, decision trees, boosted trees, or boosted stumps;

identifying an impression opportunity to deliver the content item to a viewing user of the plurality of users of the online system;

applying the trained machine learning model for determining an expected amount the viewing user will spend on one or more purchases associated with the product described in the content item for the impression opportunity, wherein:

the expected amount the viewing user will spend is based on a likelihood of a conversion of the content item by the viewing user and a value associated with the conversion by the viewing user, and the expected amount represents a value of the conversion associated with the value of a product or service described by the content item;

computing a bid amount for the content item as function of the expected amount the viewing user will spend on one or more purchases associated with the product described in the content item for the impression opportunity and a minimum return on investment (ROI), wherein:

the computed bid amount optimizes for a value of the viewing user converting on the content item for the impression opportunity, and is computed based in part by:

scaling the expected amount the viewing user will spend,
the minimum ROI,
likelihood of conversion for the content item, and
how much the viewing user is likely to spend in the conversion of the content item; and the minimum return on investment (ROI) is expressed as a relative value of converting on the content item and based on a bidding input from the third party system, wherein the bidding input comprises information associated with a combination of past history of bidding for the third party system, past indications by the third party system of a value of various types of conversions, general information provided by the third party system about conversion values for different impression opportunities, and information obtained by observing conversions for the third party system over time from various users of the online system; and providing the computed bid amount for the content item to a content item selection process.

11. The method of claim 10, wherein the expected amount the viewing user will spend converting on the content item is different for the viewing user relative to at least one other user of the online system.

12. The method of claim 10, wherein a higher expected amount that the viewing user will spend on one or more purchases associated with the product increases the computed bid amount relative to a lower expected amount that the viewing will spend.

13. The method of claim 10, wherein the spending data corresponds to individual purchases made by the plurality of users of the online system, for each purchase the spending data includes a product associated with the purchase, a price of the product, and characteristics of a purchasing user.

* * * * *